(12) United States Patent
Fries et al.

(10) Patent No.: US 7,012,531 B2
(45) Date of Patent: Mar. 14, 2006

(54) PRODUCT LABEL, METHOD OF PRODUCING PRODUCT LABELS AND METHOD FOR IDENTIFYING PRODUCTS IN A CONTACTLESS AND FORGERY-PROOF MANNER

(75) Inventors: Manfred Fries, Hunderdorf (DE); Detlef Houdeau, Langquaid (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/164,552

(22) Filed: Jun. 7, 2002

(65) Prior Publication Data

US 2002/0167407 A1 Nov. 14, 2002

Related U.S. Application Data

(63) Continuation of application No. PCT/DE99/03903, filed on Dec. 7, 1999.

(51) Int. Cl.
*G08B 13/14* (2006.01)

(52) U.S. Cl. .............................. 340/572.7; 340/572.3; 340/572.5; 340/572.8

(58) Field of Classification Search .............. 340/572.7, 340/572.3, 572.8, 572.5
See application file for complete search history.

(56) References Cited

U.S. PATENT DOCUMENTS

| | | | |
|---|---|---|---|
| 3,624,631 A | * 11/1971 | Chomet et al. | 340/568.1 |
| 4,021,705 A | 5/1977 | Lichtblau | |
| 4,567,473 A | * 1/1986 | Lichtblau | 340/572.3 |
| 4,849,766 A | 7/1989 | Inaba et al. | |
| 5,117,098 A | 5/1992 | Swartz | |
| 5,142,270 A | 8/1992 | Appalucci et al. | 340/572 |
| 5,517,195 A | 5/1996 | Narlow et al. | |
| 5,779,839 A | 7/1998 | Tuttle et al. | 156/213 |
| 5,874,902 A | * 2/1999 | Heinrich et al. | 340/10.51 |
| 6,226,619 B1 | * 5/2001 | Halperin et al. | 705/1 |
| 6,480,110 B1 | * 11/2002 | Lee et al. | 340/572.5 |

FOREIGN PATENT DOCUMENTS

| | | |
|---|---|---|
| DE | 25 23 002 | 12/1975 |
| DE | 41 29 446 A1 | 3/1992 |
| DE | 44 35 815 A1 | 4/1996 |
| DE | 298 13 738 U1 | 3/1999 |
| EP | 0 513 456 B1 | 11/1992 |
| EP | 0 595 549 B1 | 5/1994 |
| JP | 62 195 905 A | 8/1987 |
| JP | 63 013 402 A | 1/1988 |
| JP | 5 290 229 | 11/1993 |
| JP | 06 208 640 A | 7/1994 |
| JP | 08 216 571 A | 8/1996 |
| JP | 11 066 260 A | 3/1999 |
| JP | 11 175650 A | 7/1999 |
| JP | 11 286 193 A | 10/1999 |
| JP | 2003-516595 | 5/2003 |
| WO | WO 96/10803 | 4/1996 |
| WO | 99/05658 | 2/1999 |
| WO | 99/16032 | 4/1999 |

* cited by examiner

*Primary Examiner*—Tai T. Nguyen
(74) *Attorney, Agent, or Firm*—Laurence A. Greenberg; Werner H. Stemer; Ralph E. Locher

(57) ABSTRACT

A product label includes a semiconductor chip and an antenna. The semiconductor chip stores information about a product. The antenna transmits the information about the product to a reading device. The antenna has a predetermined breaking point at which the antenna can be destroyed during the reading operation by energy introduced by the reading device so that the product label can be read only for a specific number of read cycles. A method of producing product labels and a method for a contactless, forgery-proof identification of products are also provided.

31 Claims, 2 Drawing Sheets

PRODUCT LABEL, METHOD OF PRODUCING PRODUCT LABELS AND METHOD FOR IDENTIFYING PRODUCTS IN A CONTACTLESS AND FORGERY-PROOF MANNER

CROSS-REFERENCE TO RELATED APPLICATION

This application is a continuation of copending International Application No. PCT/DE99/03903, filed Dec. 7, 1999, which designated the United States and was not published in English.

BACKGROUND OF THE INVENTION

Field of the Invention

The invention relates to a product label which is suitable in particular for a contactless identification of a product, such as during an inventory. The invention relates in particular to a product label which can be used for securing products and for theft prevention. The label is particularly secure against forgery.

U.S. Pat. No. 5,779,839 discloses product labels having a chip whose information can be sent to a reading device by using an antenna.

During the sale, the storage and the sorting of products and during the checking of product stocks, there are a large number of applications in which it is desirable for a product to be subjected to a specific processing operation only for a specific number of times and in particular only once. This applies in particular to the inventory of a stock of products or goods, in which a specific product is to be counted only once. In addition, at the checkout, the price for the product should be booked only once in the cash register. In the case of expensive products or goods, it is additionally common to provide the products with an anti-theft safeguard, which triggers an alarm when the business premises are left if the safeguard has not been removed. This is normally done at the cash desk, after the price for the products has been paid. In the case of the currently normal practice, however, the situation in which the anti-theft safeguard inadvertently remains on the product cannot be ruled out, in spite of the sales price having booked in the cash register and in spite of the products having been paid for.

A product label in which a tuned circuit is energized as it passes through a monitoring point is described in U.S. Pat. No. 5,142,270. The tuned circuit is provided with a predetermined breaking point, so that through the use of a surge of energy, the tuned circuit can be destroyed and the label becomes ineffective. The label does not contain any information about the products.

SUMMARY OF THE INVENTION

It is accordingly an object of the invention to provide a product label which overcomes the above-mentioned disadvantages of the heretofore-known product labels of this general type and which contains information about the products and in the case of which this information can be read out with the aid of a reading device only a given number of times. In addition, it should be possible to produce the product label in a simple way and cost-effectively and the product label should provide the highest degree of security against forgery.

With the foregoing and other objects in view there is provided, in accordance with the invention, a product label, including:

a semiconductor chip for storing information related to a product;

an antenna operatively connected to the semiconductor chip, the antenna being configured to transmit the information related to the product to a reading device; and the antenna having a predetermined breaking point, the antenna being destructible at the predetermined breaking point by energy introduced with the reading device during a reading operation such that the product label is no longer legible after the energy has been introduced.

In other words, the invention therefore relates to a product label which includes a semiconductor chip and an antenna. Through the use of this antenna, information stored in the semiconductor chip, about the products, can be transmitted to a reading device. According to the invention, the antenna has a predetermined breaking point, in the region of which the antenna is destroyed by energy introduced by the reading device after the information has been read out as often as this is desired. For example, the number of cycles with which the reading device reads the label before the energy required to destroy the antenna is introduced can be permanently i.e. fixedly predefined. It is also possible for various types of reading devices to be used, namely on the one hand those which do not destroy the label and those which after a single reading operation, for example, provide the radiation energy needed to destroy the antenna. Following the destruction of the antenna in the region of the predetermined breaking point, the information stored in the semiconductor chip, about the products, can no longer be transmitted to the reading device. Following the introduction of the energy by the reading device, the product label is therefore no longer legible.

In this way, it is possible to ensure, for example, that during the execution of an inventory, a product identified with the product label according to the invention can be counted and registered only once. The same is true also during the entry of the product price, since after the product label has been read once, further booking into the cash register is no longer possible.

If the product label according to the invention is used in combination with a theft detector which, for example, reacts to a frequency emitted by the antenna of the product label according to the invention and then emits a warning tone or the like, this anti-theft warning can be provided only when the product label has not been read out with the associated reading device (the cash register). On the other hand, if the customer has paid for the identified products at the cash register, as envisaged, the anti-theft safeguard is also deactivated at the same time by the reading operation, so that an alarm is no longer triggered. A separate operation for removing the anti-theft safeguard is no longer required.

Since the information about the product is stored in a semiconductor chip in the product label according to the invention, forgery of this information is virtually ruled out. However, the product label can also be used in such a way that when counting the products during an inventory, the energy required to destroy the antenna is not introduced into the label, and the latter therefore remains legible. The product price can then still be communicated to a cash register. The destruction of the antenna is expediently carried out after the price of the product has been booked into the cash register, through the use of injecting energy at a suitable frequency through the use of the cash-register reading device.

The product label according to the invention can contain either a rod antenna or an antenna coil as the antenna.

In addition, it is possible for the product label to include not just one but a further antenna. This can be expedient in particular when the range of the antenna is to be increased.

The product label according to the invention preferably has an antenna coil, which is coupled capacitively to a rod antenna. The predetermined breaking point can then be present either in the antenna coil or in the rod antenna. The product label according to the invention is preferably configured in such a way that the predetermined breaking point is present in the antenna coil and the latter is short-circuited.

The semiconductor chip which contains the information about the products can have an electrical contact made either with the rod antenna or with the antenna coil. With regard to the production of the product label according to the invention, electrical contact is preferably made with the rod antenna.

The predetermined breaking point in the antenna or one of the antennas belonging to the product label according to the invention is expediently configured in such a way that the energy introduced into the antenna by the reading device is reliably sufficient to destroy the antenna in the region of the predetermined breaking point. The predetermining breaking point is preferably formed by a narrowing of the antenna cross section.

The antennas can in principle be produced from all suitable electrically conductive materials. Suitable in particular are those materials which are used for antennas in non-contact chip cards. From the standpoint of production feasibility and price, a suitable material for a rod antenna is in particular a filament or strip made of electrically conductive plastic. Such materials are known in principle. They involve electrically conductive particles (metals or metal-coated particles) which are applied to a plastic or embedded in a plastic matrix.

The base material used for the product label according to the invention can in principle be any material used for labels. Plastic films and in particular cast films are particularly suitable as the base element for the product label according to the invention.

In preferred variants of the invention, the rod antenna is embedded in the base element of the product label. The same is true of the semiconductor chip. In the case of an antenna coil, however, it may be more expedient to print the latter onto the base element.

The product labels according to the invention can be fixed to the associated products in any known manner. The labels are preferably adhesively bonded to the products.

For this purpose, one of the surfaces of the product label according to the invention can be coated with an adhesive.

In order to prevent the product labels according to the invention from being removed from the products and reused on other products, the labels according to the invention are expediently formed in such a way that they cannot be removed in one piece from the products identified.

With the objects of the invention in view there is also provided, a product label, including:

a semiconductor chip for storing product information;

an antenna operatively connected to the semiconductor chip, the antenna being configured to transmit the product information during a reading operation; and the antenna having a predetermined breaking point, the antenna being destructible at the predetermined breaking point by energy introduced during the reading operation.

With the objects of the invention in view there is also provided, a method of producing product labels, the method includes the steps of:

a) fixing semiconductor chips to an antenna element selected from the group consisting of an antenna filament and an antenna strip, the antenna element including a plurality of rod antennas;

b) producing electrically conductive contacts between the semiconductor chips and associated ones of the rod antennas;

c) producing a cast film including a plurality of product label base elements such that, when casting a film for producing the cast film, a preliminary stage of the rod antennas produced in step a) is embedded in the film such that for each of the base elements there is a respective one of the rod antennas with a respective one of the semiconductor chips; and d) separating the cast film into product labels.

In other words, the product label according to the invention is expediently produced in accordance with the following method:

Firstly, semiconductor chips are fixed to an antenna filament or an antenna strip which includes a plurality of rod antennas. For each rod antenna which is contained in the antenna filament or antenna strip, one semiconductor chip is fixed. Then, the electrically conductive contacts are produced between the respective semiconductor chip and the associated rod antenna. This can be done in a manner known per se, for example by using bonding wires or through the use of blobs of solder, electrically conductive adhesive or the like.

In a further method step, the preliminary stage of the rod antenna obtained in the preceding step is then embedded in the product label base element. A cast film is used as the base element. During the casting of the film, the preliminary stage of the rod antenna is arranged in such a way that, for each base element which is included in the cast film, there is a rod antenna with the semiconductor chip fastened thereto. The production of cast films and the plastics that can be used are known to those skilled in the art and therefore do not have to be explained specifically here. In the last step of the method, the product labels according to the invention are separated. This is preferably carried out through the use of a punching operation.

Before the separation of the product labels, a further antenna, for example an antenna coil, can be printed onto one of the surfaces of the base elements which are included in the cast film. This may be expedient, as mentioned, if the range with which the product label according to the invention is to transmit information to a reading device is to be increased.

If the product label according to the invention is to be used as an adhesive label, then before the separation of the product labels and, if necessary, following the printing of a further antenna onto one of the surfaces of the product label base element, an adhesive layer can be applied. In order to simplify the production, it is expedient to coat one surface of the entire cast film with an adhesive layer and then to punch the individual labels out of the film.

With the objects of the invention in view there is also provided, a method for a contactless identification of a product, the method includes:

providing a product label having a semiconductor chip for storing information related to the product, and having an antenna operatively connected to the semiconductor chip, the antenna having a predetermined breaking point;

transmitting, with the antenna, the information related to the product to a reading device for performing a reading operation; and destroying the antenna at the predetermined breaking point with energy introduced with the reading device during the reading operation such that the product label is no longer legible after the energy has been introduced.

According to another mode of the invention, the product label is used when taking an inventory of products.

According to another mode of the invention, the label is used for providing an anti-theft safeguarding by using the product label as a forgery-proof label.

Other features which are considered as characteristic for the invention are set forth in the appended claims.

Although the invention is illustrated and described herein as embodied in a product label, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
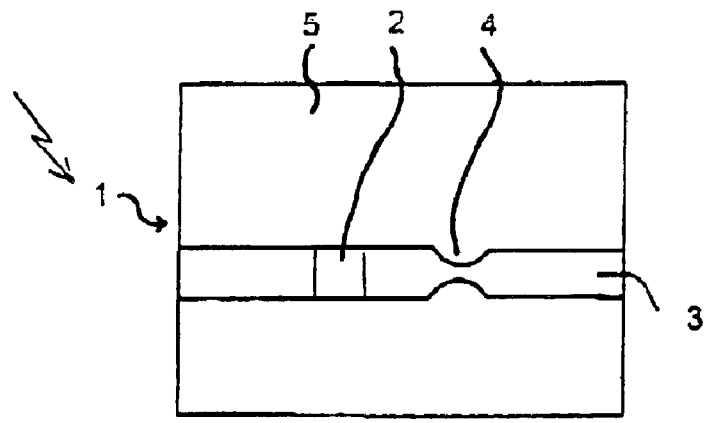
FIGS. 1 to 3 are diagrammatic plan views of various exemplary embodiments of product labels according to the invention.

Referring now to the figures of the drawings in detail and first, particularly, to FIG. 1 thereof, there is shown a product label 1 according to the invention, including a base element 5 which here is formed of a cast film. This cast film is produced from a plastic with a low tearing strength, so that after the product label 1 has been adhesively bonded onto a product, it can no longer be removed from the latter in one piece, since the film tears when pulled off. Embedded in the base element 5 is a semiconductor chip 2, which contains stored information about the products on which the label according to the invention is to be fixed. The information can include, for example, the type of product, the item number and its price. The information can be transmitted to a suitable reading device by a rod antenna 3, on which the semiconductor chip is fixed and with which electrically conductive contact is made.

Formed in the region of the rod antenna 3 is a predetermined breaking point 4. It is formed by a narrowing of the antenna cross section. This predetermined breaking point 4 is formed in such a way that the antenna is destroyed in its region when, during the reading operation, after the reading of the information stored in the semiconductor chip in accordance with the carrier frequency of the antenna 3, energy is injected into the antenna by the reading device. The destruction of the antenna 3 in the region of the predetermined breaking point 4 means that the information which is stored in the semiconductor chip 2, about the products, is transmitted to the reading device and evaluated only as long as the energy sufficing to destroy the antenna 3 has not been injected into the antenna by the reading device. During further read cycles, the product label is no longer legible, because of the destruction of the antenna 3.

The information stored in the product label according to the invention can therefore be evaluated only during a desired number of read cycles.

Figure 2:
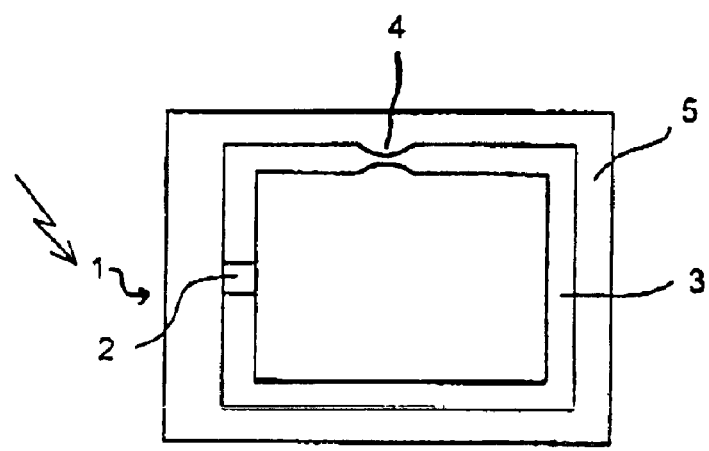

FIG. 2 shows a further embodiment of a product label according to the invention. In this figure, as in all the following figures, identical reference symbols designate the same parts as in FIG. 1.

The product label illustrated in FIG. 2 differs from that shown in FIG. 1 in the formation of the antenna 3. Instead of a rod antenna, here an antenna coil is printed onto the base element 5. The semiconductor 2 is embedded in the base element 5, and the contacts are led out to a surface of the base element 5, such that they can make an electrically conductive contact there with the antenna, which is short-circuited.

Alternatively, it is also possible to embed the antenna coil 3 in the base element 5.

Figure 3:
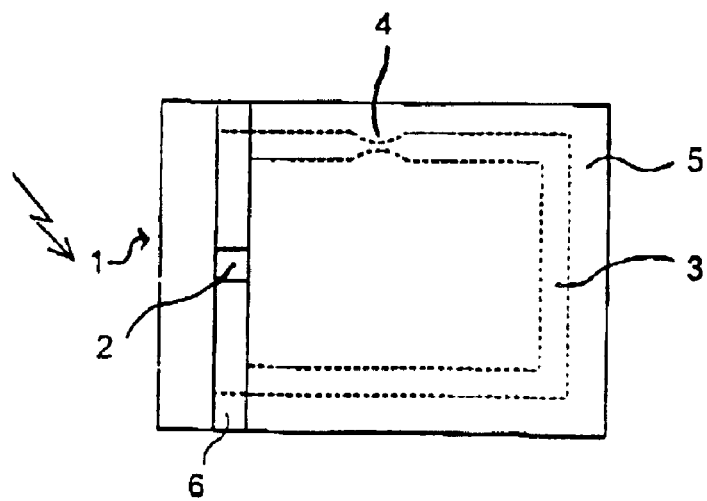

FIG. 3 shows a product label in which a rod antenna 6 and an antenna coil 3 are combined with each other, in order to permit a higher transmission range.

The rod antenna 6 and the semiconductor chip 2, which electrically conductively contacts the rod antenna, are embedded in the cast film of the base element 5. The antenna coil 3, which permits the improved range, is printed onto the rear of the base element 5. The limb, located on the left in FIG. 3, of the intrinsically closed antenna coil 3 runs underneath the rod antenna 6. In this way, capacitive coupling between the two antennas can be achieved. The predetermined breaking point 4 is formed in the antenna coil 3.

FIG. 4 clarifies the method according to the invention for producing a product label. The method is described using the example of the production of the product label illustrated in FIG. 3.

Figure 4A:
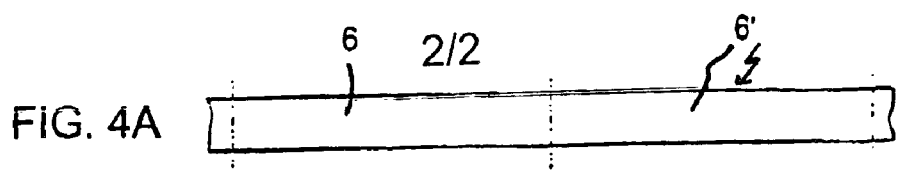
FIGS. 4a to 4d are diagrammatic partial views for illustrating various preliminary and intermediate stages during the production of a product label according to the invention in accordance with the method of the invention.

As a preliminary stage of the rod antenna 6, use is made of an antenna strip 6', which includes a plurality of rod antennas 6 abutting at their ends (FIG. 4a). In a first step, the semiconductor chips 2 are fixed to the antenna strip 6', specifically in such a way that there is one semiconductor chip 2 for each rod antenna. In addition, electrically conductive contact is made between the semiconductor chips and the respectively associated rod antenna 6. This can expediently be done in the same step as the fixing of the semiconductor chips to the rod antennas. If the antenna preliminary stage 6' is an antenna filament or an antenna strip which has been produced from a conductive plastic, the fixing and contacting are expediently carried out with an electrically conductive adhesive.

Figure 4B:
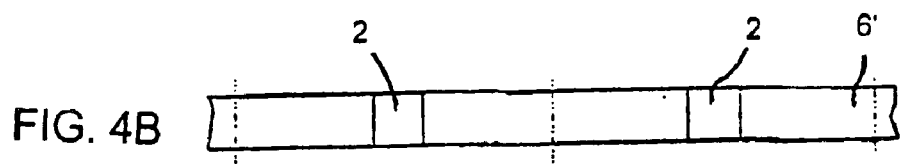
Figure 4C:
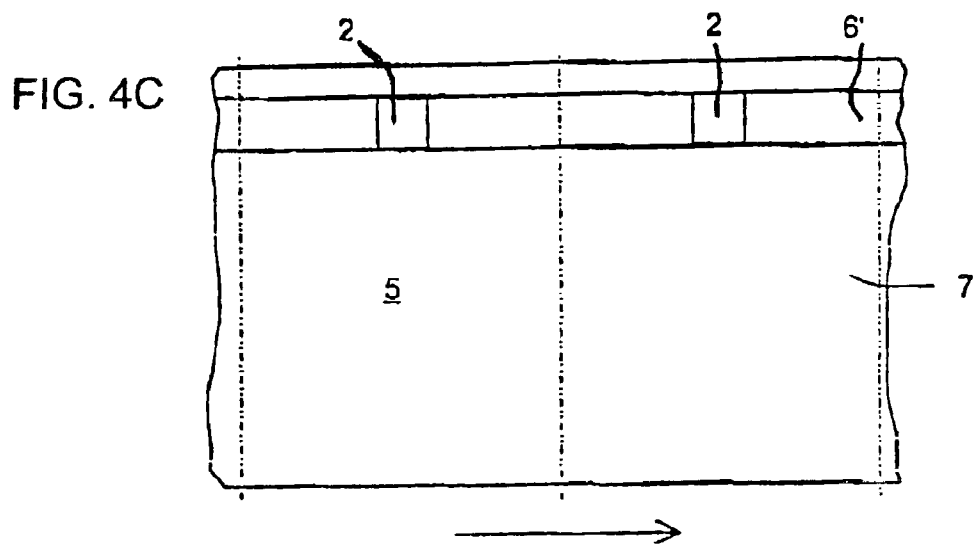

In a next step (FIG. 4c), the preliminary stage of the rod antenna produced in FIG. 4b is embedded in a cast film 7. This cast film 7 includes a plurality of product label base elements 5, which are indicated by the dash-dotted lines. The preliminary stage of the rod antenna is embedded in the cast film in such a way that for each base element 5 there is a rod antenna 6 with a semiconductor chip 2. The production and processing of the cast film 7 are expediently carried out with the devices provided for the production of these films. The machine direction during the production and processing is indicated by arrows in FIGS. 4c and 4d.

Figure 4D:
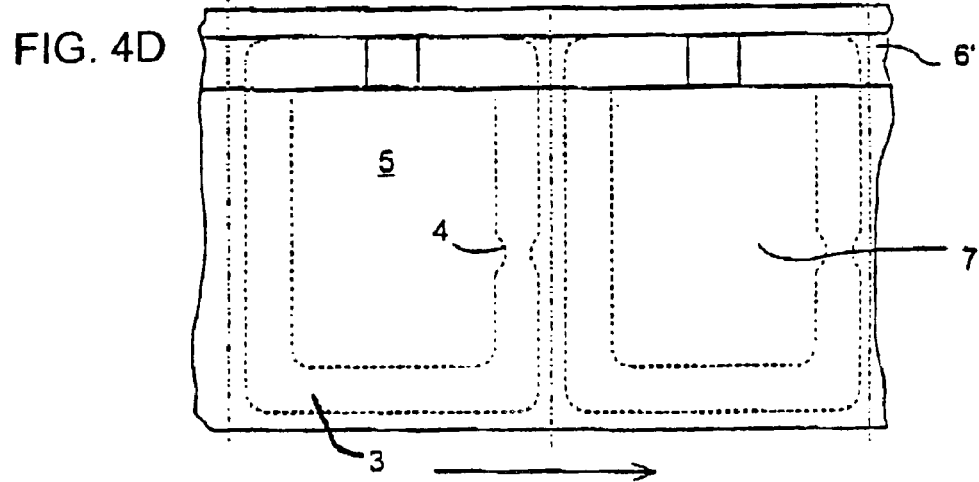

Following the embedding of the preliminary stage of the rod antenna into the cast film, an antenna coil 3 is printed onto a surface of the film for each of the base elements of the product labels included in the film. As a result, the intermediate stage illustrated in FIG. 4d is obtained.

If the product labels are to be used as adhesive labels, then the printing of the antenna coils 3 can be followed by coating one of the surfaces of the cast film 7 with an adhesive layer.

Finally, the individual product labels are separated from one another by punching along the dash-dotted lines. If desired, the product labels according to the invention can be printed or covered with a layer which can be printed or inscribed or is already inscribed. In addition, the adhesive layer can be provided with a pull-off layer. These steps are expediently likewise carried out before the separation of the respective product labels, since production may be simplified in the case of this method step sequence.

We claim:

1. A product label, comprising:
   a semiconductor chip for storing information related to a product;
   an antenna operatively connected to said semiconductor chip, said antenna being configured to transmit the information related to the product with a first energy at a first frequency to a reading device;
   said antenna having a cross-section and a predetermined breaking point, said predetermined breaking point being configured as a narrowing in said cross section; and
   said antenna being destructible at said predetermined breaking point by a second energy having a second frequency introduced with the reading device during a reading operation such that the product label is no longer legible after the energy has been introduced.

2. The product label according to claim 1, wherein said antenna is a rod antenna.

3. The product label according to claim 2, wherein said rod antenna is one of a filament and a strip of electrically conductive plastic.

4. The product label according to claim 1, wherein said antenna is an antenna coil.

5. The product label according to claim 1, including a further antenna operatively connected to said semiconductor chip.

6. The product label according to claim 1, including:
   a rod antenna, and
   said antenna being capacitively coupled to said rod antenna.

7. The product label according to claim 6, wherein said antenna is an antenna coil.

8. The product label according to claim 7, wherein said predetermined breaking point is formed in said antenna coil, and said antenna coil is short-circuited.

9. The product label according to claim 7, wherein said semiconductor chip and said rod antenna are electrically conductively connected to one another.

10. The product label according to claim 6, wherein said rod antenna is one of a filament and a strip of electrically conductive plastic.

11. The product label according to claim 1, including a plastic film as a base element for carrying said semiconductor chip and said antenna.

12. The product label according to claim 11, wherein said plastic film is a cast film.

13. The product label according to claim 11, wherein said antenna in embedded in said base element.

14. The product label according to claim 11, wherein said semiconductor chip is embedded in said base element.

15. The product label according to claim 11, wherein said antenna is printed onto said base element.

16. The product label according to claim 1, including a label surface with an adhesive coating.

17. The product label according to claim 16, wherein said label surface with said adhesive coating is configured such that the product label cannot be removed in one piece from a labeled product.

18. A method of producing product labels according to claim 1, the method which comprises:
   a) fixing semiconductor chips to an antenna element selected from the group consisting of an antenna filament and an antenna strip, the antenna element including a plurality of rod antennas;
   b) producing electrically conductive contacts between the semiconductor chips and associated ones of the rod antennas;
   c) producing a cast film including a plurality of product label base elements such that, when casting a film for producing the cast film, a preliminary stage of the rod antennae produced in step a) is embedded in the film such that for each of the base elements there is a respective one of the rod antennas with a respective one of the semiconductor chips; and
   d) separating the cast film into product labels.

19. The method according to claim 18, which comprises printing respective further antennas onto respective surfaces of the base elements prior to separating the cast film into the product labels.

20. The method according to claim 19, which comprises applying an adhesive layer on the respective surfaces of the base elements subsequent to printing the further antennas onto the respective surfaces of the base elements.

21. The method according to claim 18, which comprises applying an adhesive layer on respective surfaces of the base elements prior to separating the cast film into the product labels.

22. The method according to claim 18, which comprises using a punching operation for carrying out the step of separating the cast film into the product labels.

23. A method for producing antitheft devices, which comprises:
   producing a product label according to claim 1 by a method including the following steps:
      a) fixing semiconductor chips to an antenna element selected from the group consisting of an antenna filament and an antenna strip, the antenna element including a plurality of rod antennas;
      b) producing electrically conductive contacts between the semiconductor chips and associated ones of the rod antennas;
      c) producing a cast film including a plurality of product label base elements such that, when casting a film for producing the cast film, a preliminary stage of the rod antennas produced in step a) is embedded in the film such that for each of the base elements there is a respective one of the rod antennas with a respective one of the semiconductor chips; and
      d) separating the cast film into product labels;
   producing a theft detector configured to react to a frequency emitted by the antenna of the product label and configured to be deactivated when the antenna of the product label is destructed; and
   attaching the product label to a product.

24. A method for preventing theft of a product until purchase, which comprises:
   producing an antitheft device by a method including the following steps:
      producing a product label according to claim 1 by a method including the following steps:
         a) fixing semiconductor chips to an antenna element selected from the group consisting of an antenna filament and an antenna strip, the antenna element including a plurality of rod antennas;

b) producing electrically conductive contacts between the semiconductor chips and associated ones of the rod antennas;

c) producing a cast film including a plurality of product label base elements such that, when casting a film for producing the cast film, a preliminary stage of the rod antennas produced in step a) is embedded in the film such that for each of the base elements there is a respective one of the rod antennas with a respective one of the semiconductor chips; and d) separating the cast film into product labels;

producing a theft detector configured to react to a frequency emitted by the antenna of the product label and configured to be deactivated when the antenna of the product label is destructed; and attaching the product label to a product, reading the information related to the product transmitted by the antenna at the first energy having the first frequency from the product label with a reading device; and destroying the antenna of the product label with the second energy emitted by the reading device and thereby deactivating the theft detector.

25. A product label, comprising:

a semiconductor chip for storing product information;

an antenna operatively connected to said semiconductor chip, said antenna being configured to transmit the product information with a first energy at a first frequency during a reading operation;

said antenna having a cross-section and a predetermined breaking point, said predetermined breaking point being configured as a narrowing in said cross section; and said antenna being destructible at said predetermined breaking point by a second energy having a second frequency introduced during the reading operation.

26. A method for a contactless identification of a produce, the method which comprises:

providing a product label having a semiconductor chip for storing information related to the product, and having an antenna operatively connected to the semiconductor chip, the antenna having a cross-section and a predetermined breaking point configured as a narrowing in the cross section;

transmitting, with the antenna, the information related to the product with a first energy at a first frequency to a reading device for performing a reading operation; and destroying the antenna at the predetermined breaking point with a second energy having a second frequency introduced with the reading device during the reading operation such that the product label is no longer legible after the energy has been introduced.

27. The method according to claim 26, which comprises using the product label when taking an inventory of products.

28. The method according to claim 26, which comprises providing an anti-theft safeguarding by using the product label as a forgery-proof label.

29. An antitheft device, comprising:

a product label including:

a semiconductor chip for storing information related to a product;

an antenna operatively connected to said semiconductor chip, said antenna being configured to transmit the information related to the product with a first energy at a first frequency to a reading device;

said antenna having a cross-section and a predetermined breaking point, said predetermined breaking point being configured as a narrowing in said cross section; and said antenna being destructible at said predetermined breaking point by a second energy having a second frequency introduced with the reading device during a reading operation such that the product label is no longer legible after the energy has been introduced; and a theft detector configured to react to the first frequency emitted by said antenna of said product label.

30. The antitheft device according to claim 29, wherein said theft detector emits a warning tone when reacting to the first frequency emitted by said antenna of said product label before said antenna being destructed.

31. The antitheft device according to claim 29, wherein said theft detector is deactivated when said antenna is destructed by the second energy.

* * * * *

UNITED STATES PATENT AND TRADEMARK OFFICE
CERTIFICATE OF CORRECTION

| | | |
|---|---|---|
| PATENT NO. | : 7,012,531 B2 | Page 1 of 1 |
| APPLICATION NO. | : 10/164552 | |
| DATED | : March 14, 2006 | |
| INVENTOR(S) | : Manfred Fries et al. | |

It is certified that error appears in the above-identified patent and that said Letters Patent is hereby corrected as shown below:

Column 9, Claim 26, Line 41 should read as follows:

26. A method for a contactless identification of a product, the method which comprises:

Signed and Sealed this

Fifth Day of December, 2006

JON W. DUDAS
*Director of the United States Patent and Trademark Office*